United States Patent
Spath

(10) Patent No.: US 11,200,513 B2
(45) Date of Patent: Dec. 14, 2021

(54) REAL ESTATE IMAGE ANALYSIS

(71) Applicant: Carrier Corporation, Palm Beach Gardens, FL (US)

(72) Inventor: Tony Spath, West Hartford, CT (US)

(73) Assignee: Carrier Corporation, Palm Beach Gardens, FL (US)

( * ) Notice: Subject to any disclaimer, the term of this patent is extended or adjusted under 35 U.S.C. 154(b) by 585 days.

(21) Appl. No.: 16/155,059

(22) Filed: Oct. 9, 2018

(65) Prior Publication Data

US 2019/0114727 A1    Apr. 18, 2019

Related U.S. Application Data

(60) Provisional application No. 62/571,973, filed on Oct. 13, 2017.

(51) Int. Cl.
| | |
|---|---|
| *G06Q 50/16* | (2012.01) |
| *G06F 3/0482* | (2013.01) |
| *G06T 7/90* | (2017.01) |
| *G06T 7/44* | (2017.01) |
| *G06N 20/00* | (2019.01) |
| *G06Q 30/02* | (2012.01) |

(52) U.S. Cl.
CPC .......... *G06N 20/00* (2019.01); *G06F 3/0482* (2013.01); *G06Q 30/0206* (2013.01); *G06Q 30/0282* (2013.01); *G06Q 50/163* (2013.01); *G06T 7/44* (2017.01); *G06T 7/90* (2017.01)

(58) Field of Classification Search
CPC combination set(s) only.
See application file for complete search history.

(56) References Cited

U.S. PATENT DOCUMENTS

| | | |
|---|---|---|
| 5,680,305 A | 10/1997 | Apgar, IV |
| 7,219,078 B2 | 5/2007 | Lamont et al. |
| 7,818,265 B2 | 10/2010 | Loveland |
| 7,970,674 B2 | 6/2011 | Cheng et al. |
| 8,046,306 B2 | 10/2011 | Stinson |
| 8,078,436 B2 | 12/2011 | Pershing et al. |
| 8,170,840 B2 | 5/2012 | Pershing |
| 8,207,964 B1 | 6/2012 | Meadow et al. |
| 8,676,680 B2 | 3/2014 | Humphries et al. |
| 8,832,115 B2 | 9/2014 | Smintina et al. |
| 9,082,015 B2 | 7/2015 | Christopulos et al. |
| 9,536,148 B2 | 1/2017 | Gross |

(Continued)

FOREIGN PATENT DOCUMENTS

TW    M526142 U    7/2016

*Primary Examiner* — Omar S Ismail
(74) *Attorney, Agent, or Firm* — Bachman & LaPointe, P.C.

(57) ABSTRACT

A method for scoring attractiveness of a real estate property including receiving an image from a subject real estate property; converting the image to RGB data; and identifying an attractiveness score from the RGB data. A real estate property attractiveness scoring application including an image processor to receive an image from a subject real estate property and convert the image to RGB data; a database of RGB data and an attractiveness score for the RGB data; and an artificial intelligence engine in communication with the image processor and the database to identify an attractiveness score in the database from the RGB data from the image processor.

18 Claims, 18 Drawing Sheets

FIG. 1

(56) References Cited

U.S. PATENT DOCUMENTS

| | | | |
|---|---|---|---|
| 2003/0021470 A1* | 1/2003 | Kakutani | H04N 1/40087 |
| | | | 382/162 |
| 2007/0067180 A1 | 3/2007 | James et al. | |
| 2009/0006185 A1* | 1/2009 | Stinson | G06Q 30/0278 |
| | | | 705/306 |
| 2014/0188484 A1* | 7/2014 | Huang | G06F 9/445 |
| | | | 704/275 |
| 2014/0222700 A1 | 8/2014 | Galligan et al. | |
| 2015/0213315 A1* | 7/2015 | Gross | G06F 16/5838 |
| | | | 382/159 |
| 2015/0294191 A1* | 10/2015 | Zhang | G06N 20/00 |
| | | | 382/160 |
| 2015/0356576 A1* | 12/2015 | Malaviya | G06Q 30/0202 |
| | | | 705/7.31 |
| 2015/0371112 A1 | 12/2015 | Sun et al. | |
| 2016/0224696 A1 | 8/2016 | Bhatawadekar et al. | |
| 2017/0061282 A1* | 3/2017 | Ryskamp | G06N 3/0427 |
| 2017/0061625 A1* | 3/2017 | Estrada | G06N 3/0454 |
| 2017/0140250 A1* | 5/2017 | Maloney | G06T 11/60 |
| 2017/0193617 A1 | 7/2017 | Gauglitz | |
| 2018/0018553 A1* | 1/2018 | Bach | G06K 9/4628 |
| 2018/0137390 A1* | 5/2018 | Brundage | G06K 9/6271 |
| 2018/0260793 A1* | 9/2018 | Li | G06T 7/001 |

\* cited by examiner

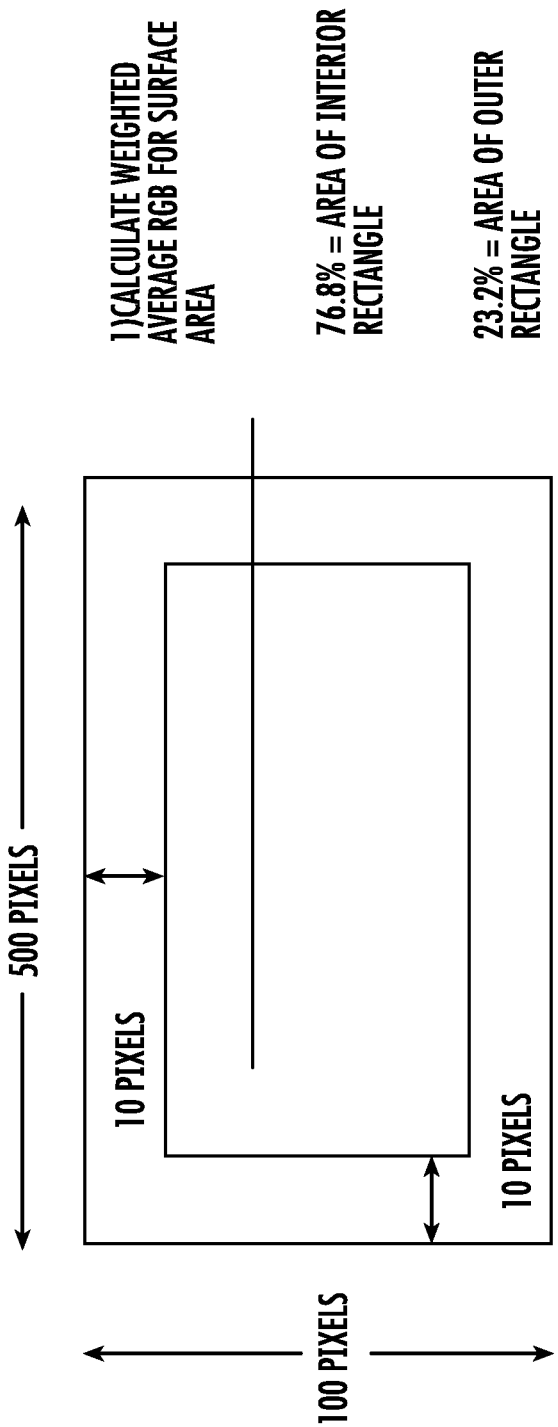

|       | R | G | B | TOTAL |
|-------|---|---|---|-------|
| WHITE | ABSOLUTE VALUE (WEIGHTED AVERAGE - WHITE) = (246.88-255) = 8.12 | ABSOLUTE VALUE (WEIGHTED AVERAGE - WHITE) = (246.88-255) = 8.12 | ABSOLUTE VALUE (WEIGHTED AVERAGE - WHITE) = (246.88-255) = 8.12 | =sum(R,G,B)= 8.12+8.12+ 8.12= 24.36 |
| BLUE  | (246.88-0) = 246.88 | (246.88-0) = 246.88 | (246.88-255( = 8.12 | =501.88 |

2) CALCULATE CLOSEST DISTANCE TO RGB SCORE BY CALCULATING DISTANCE TO ALL RGB COLORS WITH SCORES AND RANKING FROM LOW TO HIGH

3) CORRELATE THE NEAREST RGB COLOR TO ITS HISTORICAL SCORE

4) ASSIGN HISTORICAL SCORE TO PROPERTY/ROOM

LIVING ROOM GIVEN SCORE OF 8.5 BECAUSE IT IS NEAREST "WHITE"

FIG. 14

| COLOR | SCORE (1-10) | RGB RANGE |
|---|---|---|
| RED | 4.3 | (100,0,0)-(255,0,0) |
| ORANGE | 3 | (255,140,0)-(255,69,0) |
| YELLOW | 4.6 | (255,255,0)-(255,255,204) |
| GREEN | 5.2 | (0,255,0)-(0,100,0) |
| BLUE | 6.8 | (0,0,128)-(0,0,255) |
| INDIGO | 4 | (75,0,130) |
| VIOLET | 3 | (238,130,238) |
| BROWN | 6 | (165,42,42) |
| BLACK | 4.2 | (0,0,0) |
| WHITE | 8.5 | (255,255,255) |

HISTORICAL DATA

| SURFACE | SCORE (1-10) | RANGE IN RGB — FURTHEST DISTANCE BETWEEN ANY PIXEL OVER ANY OF R,G, OR B VALUE | FREQUENCY OF OUTLIERS — FURTHEST DISTANCE BETWEEN ANY PIXEL OVER ANY OF R,G, OR B VALUE |
|---|---|---|---|
| CARPET | 5.3 | SMALL* | INFREQUENT*** |
| WOOD | 8.3 | LARGE** | INFREQUENT*** |
| TILE | 7.6 | SMALL* | FREQUENT**** |
| VINYL | 3.2 | LARGE** | FREQUENT**** |

* SMALL (RANGE IN RGB) - DIFFERENCE BETWEEN ANY PIXEL NO LARGER THAN 127 OVER ANY OF R,G, OR B

** LARGE (RANGE IN RGB) - DIFFERENCE BETWEEN AT LEAST ONE PIXEL AND ANOTHER >=128 FOR ANY OF R,G, OR B

*** INFREQUENT (FREQUENCY OF OUTLIERS) - THE COUNT OF THE MIN OR MAX R,G,B IS <=10% OF ALL THE PIXELS IN THE IMAGE

**** FREQUENT (FREQUENCY OF OUTLIERS) - THE COUNT OF THE MIN OR MAX R,G,B IS >10% OF ALL THE PIXELS IN THE IMAGE

REAL ESTATE IMAGE ANALYSIS

CROSS-REFERENCE TO RELATED APPLICATIONS

This application claims the benefit of provisional application Ser. No. 62/571,793, filed Oct. 13, 2017.

BACKGROUND

The present disclosure relates generally to a real estate buyer feedback system, and more particularly, to a system and method to determine feedback based on an image analysis of a real estate property.

In the real estate industry, the listing agent must often, at the seller's behest, contact the showing agent to receive feedback as to the buyer's perspective on the home. This can be a time-consuming practice and can lead to seller frustration in understanding what actions may facilitate sale of their home from the perspective of the buyer who views their home.

SUMMARY

A computer-implemented method for scoring attractiveness of a real estate property according to one disclosed non-limiting embodiment of the present disclosure includes converting, using a processor, an image of a subject real estate property from an input device to RGB data; identifying, using the processor, an attractiveness score from the RGB data, the attractiveness score stored in a memory encoded with logic executable by the processor; and displaying the attractiveness score to a user via a display in communication with the processor.

A further aspect of the present disclosure includes receiving the image from the input device of a handheld device operating a real estate property attractiveness scoring application executable by the processor, the handheld device comprising the processor, the memory, the input device, and the display.

A further aspect of the present disclosure includes that the attractiveness score is related to historical sales data of at least one comparable property that is comparable to the subject property, the at least one comparable property and the historical sales data stored in a buyer storage system accessible by the real estate property attractiveness scoring application.

A further aspect of the present disclosure includes adjusting the attractiveness score for the at least one comparable property over time by an artificial intelligence engine in communication with the buyer storage system.

A further aspect of the present disclosure includes that the attractiveness score and RGB data are defined in the table stored in the database, the database stored in a buyer storage system accessible by a handheld device operating a real estate property attractiveness scoring application.

A further aspect of the present disclosure includes a color is identified by a range of the RGB data.

A further aspect of the present disclosure includes training an artificial intelligence engine from metatags for an image and associated attractiveness ranking, the artificial intelligence engine in communication with the processor.

A further aspect of the present disclosure includes converting the image to the RGB data comprises determining a color in a background area in the image by an artificial intelligence engine and determining a color in a contrast area in the image, the contrast area in the image different than the background area.

A further aspect of the present disclosure includes converting the image to the RGB data comprises determining a texture in the image by an artificial intelligence engine.

A further aspect of the present disclosure includes identifying the attractiveness score from the RGB data comprises determining a difference between at least one pixel and another pixel over any of R, G, or B data to determine a range in the RGB data by an artificial intelligence engine.

A further aspect of the present disclosure includes identifying the attractiveness score from the RGB data comprises determining a furthest distance to any pixel over any of R, G, or B data to determine a frequency of outliers in the RGB data by an artificial intelligence engine.

A further aspect of the present disclosure includes identifying a commercially recognized identifier from the RGB data stored in a database, the commercially recognized identifier stored in the database accessible by a handheld device operating a real estate property attractiveness scoring application.

A further aspect of the present disclosure includes identifying a paint chip number from the RGB data stored in a database, the paint chip number stored in a database accessible by a handheld device operating a real estate property attractiveness scoring application.

A further aspect of the present disclosure includes identifying an appliance brand from the RGB data stored in a database, the appliance brand stored in the database accessible by a handheld device operating a real estate property attractiveness scoring application.

A further aspect of the present disclosure includes converting the image to RGB data comprises training an artificial intelligence engine for a known color.

A further aspect of the present disclosure includes converting the image to RGB data comprises training an artificial intelligence engine with RGB data for a known texture.

A real estate property attractiveness scoring system for scoring attractiveness of a real estate property from an image of a subject real estate property according to one disclosed non-limiting embodiment of the present disclosure includes a processor and memory configured to execute software instructions embodied within the following modules: an image processor to receive an image of a subject real estate property and convert the image to RGB data; a database of RGB data and an attractiveness score associated with the RGB data; and an artificial intelligence engine in communication with the image processor and the database to identify the attractiveness score in the database that is associated with the RGB data from the image processor, the attractiveness score based at least in part on historical sales data of at least one comparable property that is comparable to the subject property.

A further aspect of the present disclosure includes at least one of the image processor, the database, and the artificial intelligence engine, are resident on a handheld device.

A further aspect of the present disclosure includes the artificial intelligence engine is operable to determine a difference between at least one pixel and another pixel over any of the R, G, or B data to determine a range in the RGB data to determine a color and an associated attractiveness score from a table stored in the database.

A further aspect of the present disclosure includes that the artificial intelligence engine is operable to determine a furthest distance to any pixel over any of the R, G, or B data to determine a frequency of outliers in the RGB data to determine a texture and an associated attractiveness score from a table stored in the database.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 13 is a schematic to illustrate operation of the real estate property attractiveness scoring application of FIG. 11.

FIG. 14 is a chart to illustrate operation of the real estate property attractiveness scoring application of FIG. 11.

FIG. 15 is a chart to illustrate operation of the real estate property attractiveness scoring application of FIG. 11.

FIG. 18 is a chart to illustrate operation of the real estate property attractiveness scoring application of FIG. 16.

DETAILED DESCRIPTION

Figure 1:
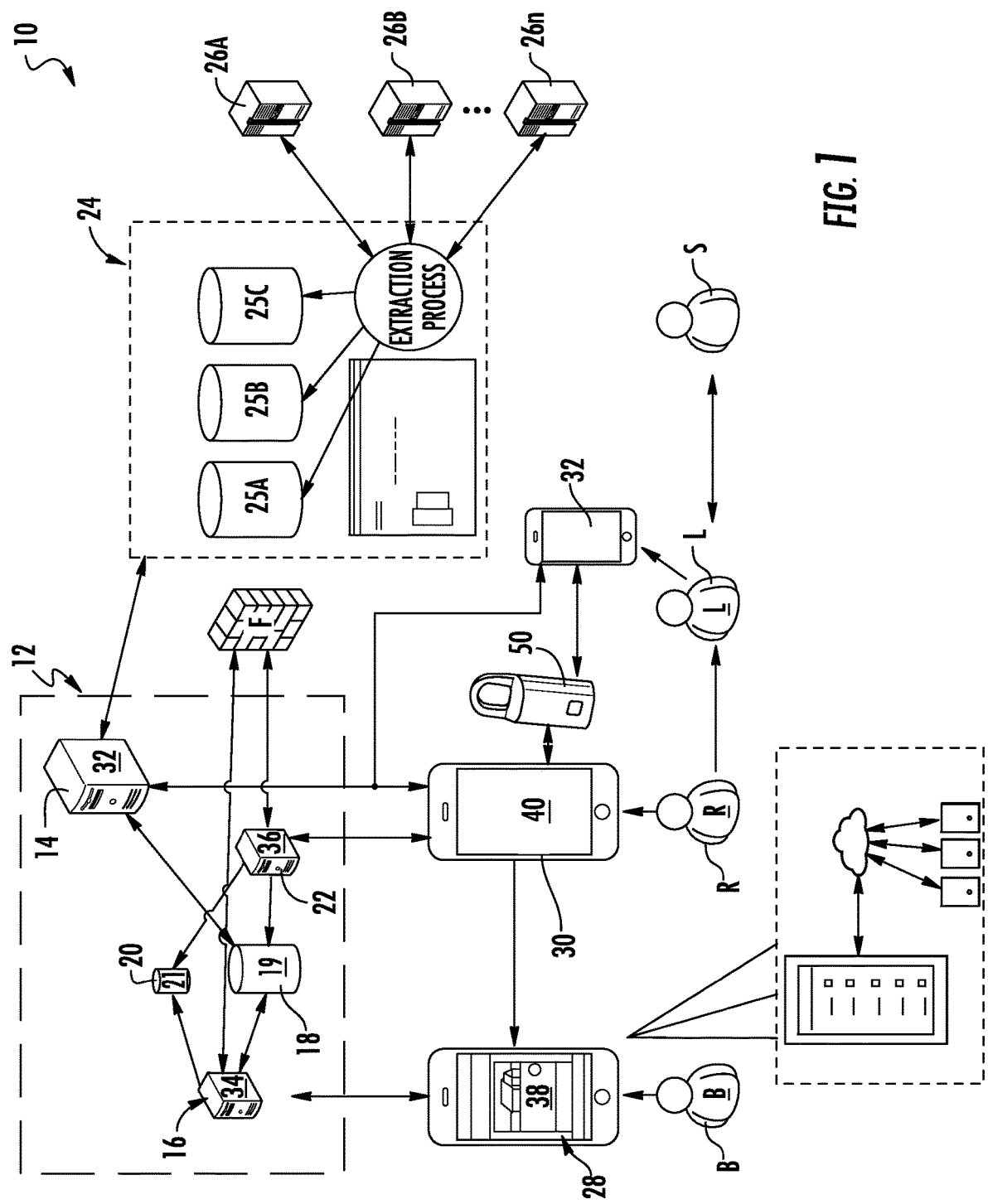
FIG. 1 is a general schematic system diagram of a real estate feedback application system.

FIG. 1 schematically illustrates a system 10 to facilitate communication for real estate transactions. A prospective property buyer "B" is typically represented by a showing agent "R" while a property seller "S" is typically represented by a listing agent "L." The listing agent "L" typically communicates with the buyer "B" only indirectly, such as by communication with the showing agent "R," who then communicates information with the buyer "B." Although only particular agents are referred to in the illustrated embodiments, the functions of such personnel may be otherwise assigned or rearranged. For example, the listing agent "L" may be a senior person in an agency who utilize a seller's assistant. The showing agent "R" may similarly utilize a showing assistant.

The system 10 generally includes a subsystem 12 that may be controlled by a single owner. The subsystem 12 generally includes one or more of a listing recommendation server 14, a buyer server 16, a buyer storage system 18, a log storage system 20, and an electronic key server 22. The listing recommendation server 14 communicates with the buyer storage system 18, the log storage system 20, and a storage system 24. The buyer storage system 18 includes a database 19 that stores, for example, feedback created by the buyer "B" (e.g., buyer feedback, third party feedback, etc.). The log storage system 20 includes a database 21 that collects activity data associated with the property showings.

The storage system 24 may include, but not be limited to, a database for managing key holders 25A, a security database 25B that hosts security protocols, and a listing database 25C that stores extracted property data from external databases 26A, 26B, 26N. The storage system 24 communicates with the external databases 26A-26N such as the Real Estate Transaction Standard (RETS) framework that stores MLS data. Communication between the various servers may include internet protocols or the like. The MLS data may include information such as number of bedrooms, number of bathrooms, price of listing, etc. RETS is a framework that can be adopted by computer systems to receive data from the Multiple Listing Service (MLS) servers, as well as those of other real estate systems provided they also have software installed designed to communicate using the RETS framework. The national association of realtors refers to RETS as a "common language."

A multiple of handheld devices 28, 30, 32, may communicate with the subsystem 12. For example, the handheld devices 28, 30, 32, may be a smartphone, tablet, or other handheld device of the respective individual. Handheld device 28 is used by the potential buyer "B," handheld device 30 is used by the showing agent "R," and handheld device 32 is used by the listing agent "L. Various other handheld devices such as those used by the third parties "T" may also be in communication with the subsystem 12 either directly or through communication with the handheld devices 28, 30, 32, as an intermediary.

Information is accessible by the listing agent "L" through the subsystem 12 so that the listing agent "L" can, for example, generate reports for their seller "S," send updates about a particular listing to showing agents "R", or provide feedback from a buyer "B" to their seller "S." The subsystem 12 may also obtain information from a Real Estate Transaction Standard (RETS) framework that stores MLS data. The subsystem 12 may also obtain information generated by an electronic key box 50 that occurs as a consequence of the showing, such as number of times shown, time spent at the subject property for each showing, return showings, etc. The subsystem 12 may also be used by the listing agents "L" to receive automatic notification (e.g., email notices) when a showing occurs at their listings. The subsystem 12 may also be used by the buyer "B" as a repository for information (e.g., details of each property the buyer has viewed, feedback on the properties, etc.). The seller "S" can also receive feedback from the buyer "B" either directly from the subsystem 12, or through communications with the listing agent "L" who communicates with the subsystem 12.

The listing recommendation server 14 hosts, for example, at least an analytics software application 32 that compiles and runs analytics against buyer ratings and MLS listing data from the storage system 24. The buyer server 16 hosts a buyer application program interface (API) 34, and the electronic key server 22 hosts an electronic key API 36. An application program interface (API) may include a set of routines, protocols, and/or tools for building software applications. The API specifies how software components should interact. APIs are used when programming graphical user interface (GUI) components. A server-side web API is a programmatic interface with one or more publicly exposed endpoints to a defined request-response message system.

The listing recommendation server 14 may communicate with a real estate application 38 on the handheld device 28 through the buyer API 34. An agent application 40 on the handheld device 30 may communicate with the listing recommendation server 14 and the electronic key server 22. The buyer API 34 and the electronic key API 36 may also communicate with other external systems through a firewall "F."

The real estate application 38 may be a mobile application on the handheld device 28 that may be used by the buyer "B" to rate the properties they have seen and, as will be further described below, receive third party feedback from third parties "T" based on the buyer "B" feedback. The real estate application 38 communicates with the buyer storage system 18 through the buyer API 34 which then stores the feedback, ratings, and notes taken by the property buyer in the database 19 of the buyer storage system 18.

The agent application 40 may be a mobile application on the handheld device 30 that may be used by the showing agent "R" to access the electronic key boxes 50 via a short distance communication standard (e.g., Bluetooth). Alternatively, or in addition, the electronic key boxes 50 may be connected (e.g., cellular) directly to the listing recommendation server 14. The electronic key API 36 of the electronic key server 22 communicates with the agent application 40 to sync activity information from the electronic key boxes 50 to the electronic key API 36 (e.g., accessed key boxes, update the count of proprietary keys generated for that particular property, create a timestamp indicating that lockbox is opened), and showing notifications (e.g., to an associated showing agent "R").

Figure 2:
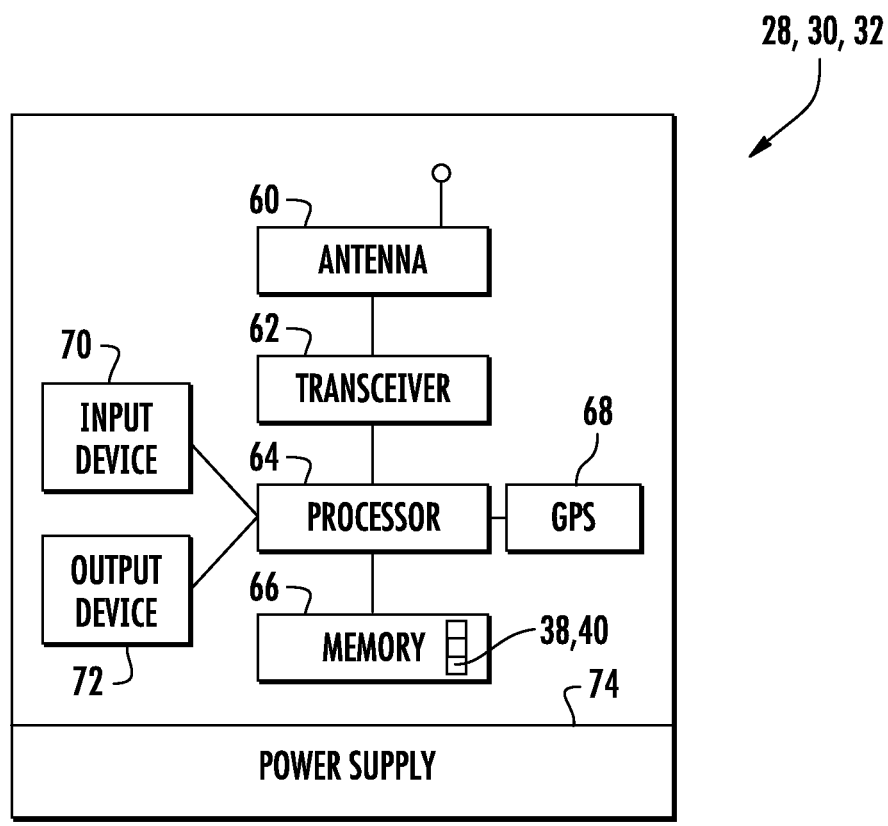
FIG. 2 is a schematic diagram of a handheld device.

With reference to FIG. 2, each handheld device 28, 30, 32, generally includes a handheld device antenna 60, a handheld device transceiver 62, a handheld device processor 64, a handheld device memory 66, a GPS module 68, an input device 70, a display 72, and a handheld device power supply 74. The handheld device processor 64 may be any type of microprocessor having desired performance characteristics. The handheld device memory 66 may include any type of computer readable medium that stores the data and executable instructions described herein below. The executable instructions may be stored or organized in any manner and at any level of abstraction, such as in connection with one or more applications, processes, routines, procedures, methods, etc. The handheld device transceiver 62 is a transceiver of a type corresponding to the transceiver 62 and the handheld device antenna 60 is a corresponding antenna.

Figure 3:
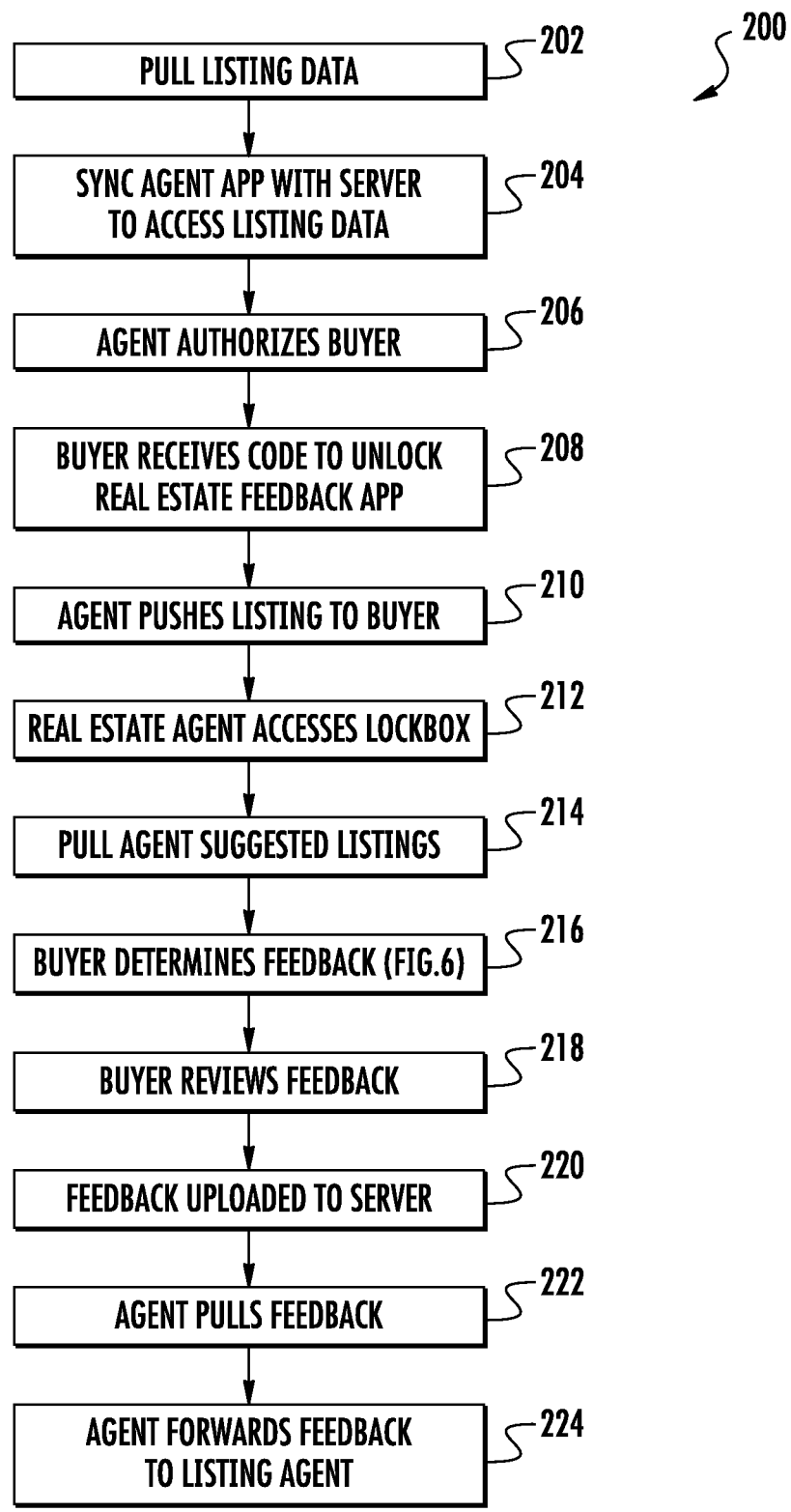
FIG. 3 is a flowchart of a method to provide feedback for real estate, with the system of FIG. 1.

With reference to FIG. 3, a method 200 for operation of the system 10 is disclosed in terms of functional block diagrams. The functions are programmed software routines capable of execution in various microprocessor based electronics control embodiments and represented herein as block diagrams.

Initially, the owner of the subsystem 12 may have agreements with MLS to selectively extract (202) data such as MLS data from the external data servers 26A-26N (FIG. 1) through the listing recommendation server 14. Next, the agent application 40 syncs (204) with the listing recommendation server 14 and pulls MLS data for desired property listings of interest to the buyer "B" as, for example, selected by the showing agent "R." This may be performed through an automated sync through the agent application 40. The showing agent "R" may also perform a manual sync to obtain the MLS data.

Through the agent application 40, the showing agent "R" can then authorize (206) the property buyer "B" to access the desired property listings of interest to the buyer "B." Through the agent application 40, the showing agent "R" may, for example, authorizes the buyer "B" through input of buyer identification information (e.g., buyer name and email address.) The buyer identification information is then communicated to the listing recommendation server 14 so that the listing recommendation server 14 communicates the buyer "B" (e.g., via email to provide a link to an app store) with a code to unlock (208) the real estate application 38. The buyer "B" is then authorized to download the real estate application 38 and the desired property listings of interest to the buyer "B," to maintain the value of the showing agent "R" in the real estate transaction. Alternatively, the buyer "B" already has the real estate application 38 and the desired property listings of interest to the buyer "B" are readily received.

Figure 4:
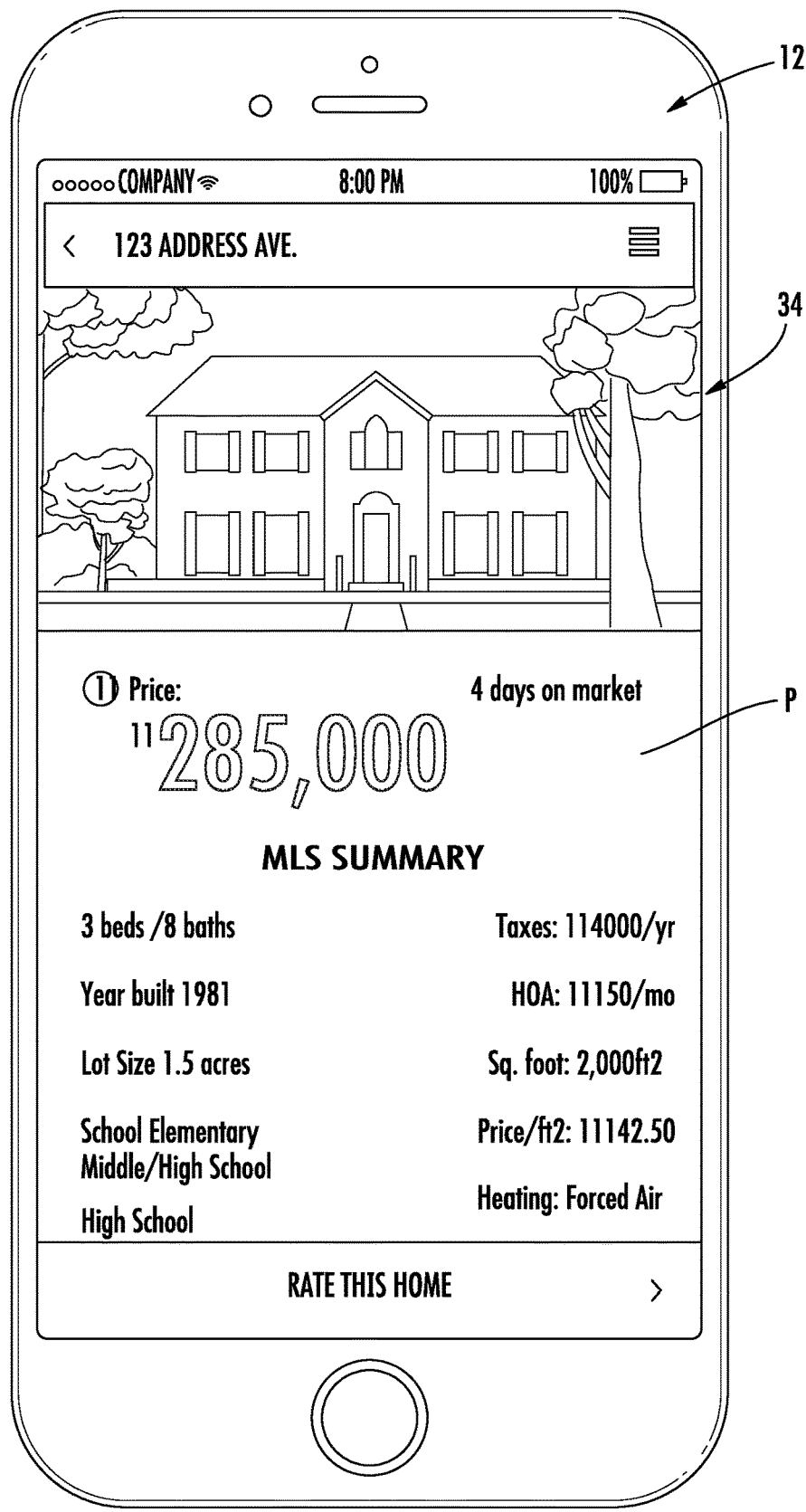
FIG. 4 is a screenshot of the real estate feedback application property listing view.

Through the agent application 40, the showing agent "R" can continue to push (210) property listings to the real estate application 38. Access may be provided for one or more properties by a showing code, or other information that unlocks one or more modules in the real estate application 38. The modules may include features or other aspects that are particular tailored to certain parties in the real estate transaction. The showing agent "R" is able to selectively push the desired property listings of interest to the buyer "B" (one example property listing illustrated by screenshot "P"; FIG. 4) through the subsystem 12 to be viewable within the real estate application 38. The showing agent "R" also uses the agent application 40 to operate the electronic key box 50 to access the property for showing to the buyer "B."

Figure 5:
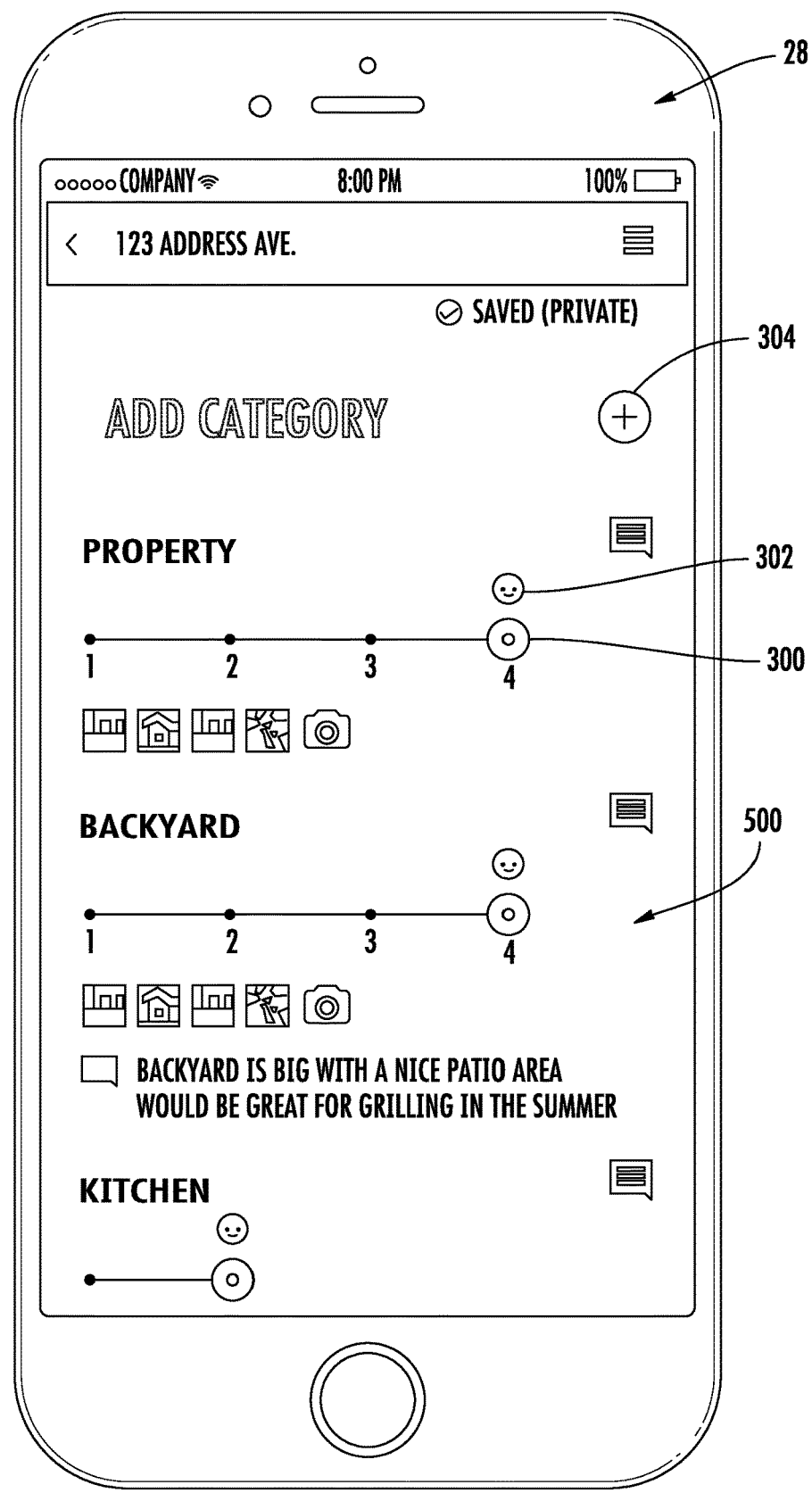
FIG. 5 is a screenshot of the real estate feedback application feedback view.
Figure 6:
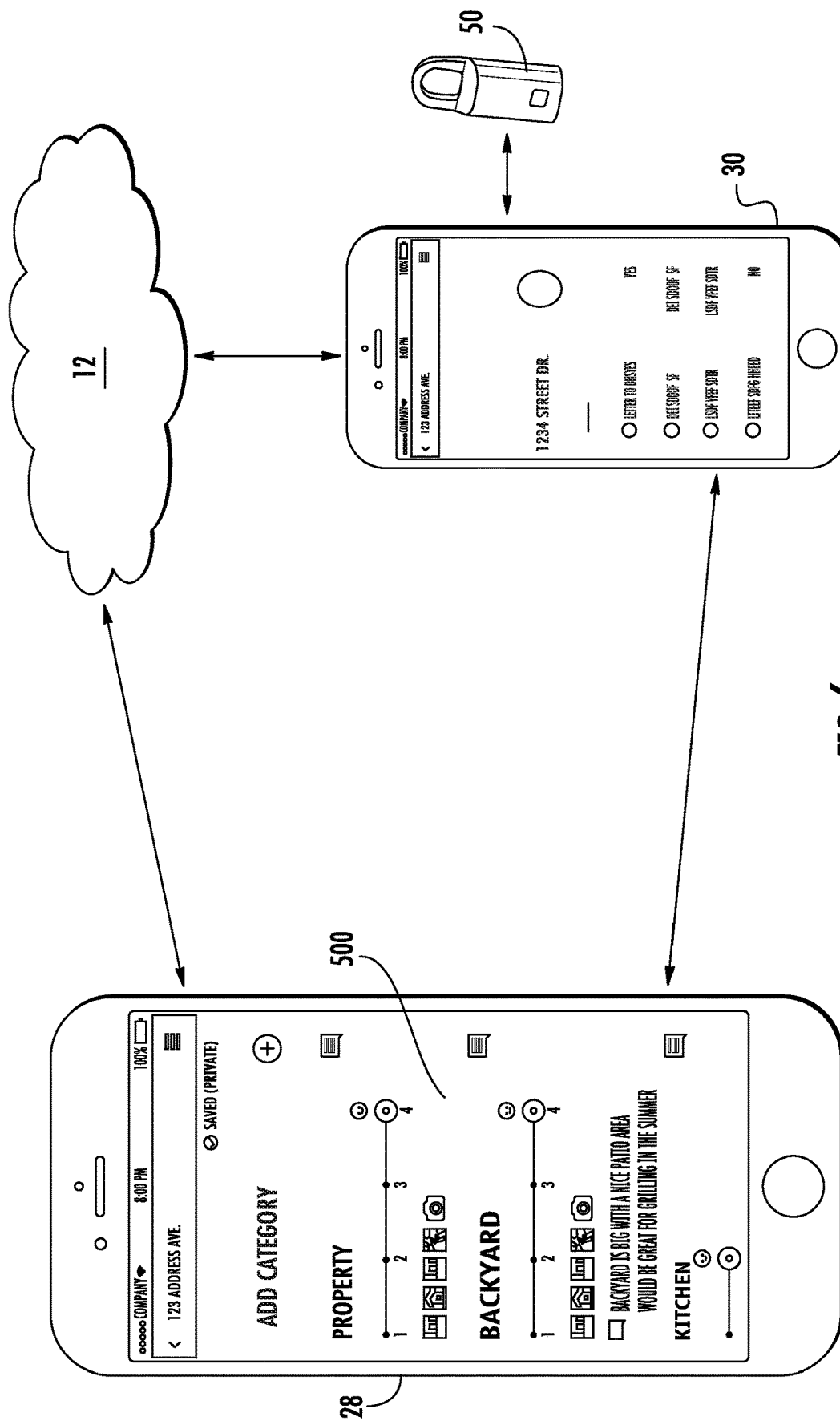
FIG. 6 is a schematic diagram of a system to provide feedback for real estate which is a portion of the system of FIG. 1.

Next, during the showing, feedback is entered into the real estate feedback application 500 by the buyer "B" for the property (216; FIG. 5 and FIG. 6) as further discussed below. The feedback may include any data associated with the properties that may, for example, facilitate reviewing and comparing properties. The real estate feedback application 500 may be a module of the real estate application 38, and/or other application.

In addition to the features discussed above, the buyer "B" can utilize the real estate feedback application 500 to record feedback for each property visited. In one or more embodiments, the buyer "B" can take pictures, videos, and/or notes during the property showing. In one or more embodiments, the feedback may be provided as a scale rating (FIG. 5). For example, the scale rating may be numeric 300 (e.g., 1-10), emoji based 302 (e.g., happy face, sad face), color coded (e.g., red, yellow, green), or other such ranking. Further, the rating may be specific to particular locations of the property, (e.g., backyard, kitchen, etc.) and/or features, (e.g., appliances, fixtures, etc.). In one or more embodiments, the buyer "B" is prompted for feedback. In one or more embodiments, the buyer is prompted for feedback based on the location of the buyer within the property (e.g., via global positioning of the buyer within the property by way of the GPS module 68 (FIG. 2)) such that when the buyer enters, for example, the kitchen, the real estate feedback application 500 prompts the buyer for feedback on the kitchen, etc. In one or more embodiments, the buyer can add a category 304 to provide feedback thereon (e.g., garage).

The feedback is then saved in memory 66 (FIG. 2) via the real estate feedback application 500 so that the buyer can review at a later time (218). The feedback can also be used to compare properties reviewed by the buyer. As the buyer generates feedback about the property, the real estate feedback application 500 may also upload the feedback to the buyer storage system 18 via the buyer API 34 (220; FIG. 1). Once the showing is complete, the buyer "B" can choose to selectively share the feedback with their showing agent "R" via the real estate feedback application 500 which, in response, authorizes the listing recommendation server 14 to release the feedback from the buyer storage system 18. The agent application 40 then syncs with the listing recommendation server 14 and downloads the feedback (222). The showing agent "R" is then able to review the feedback on the agent application 40.

Through the agent application 40, the showing agent "R" can communicate the feedback to the listing agent "L" (224). In one or more embodiments, the feedback may be forwarded through an email app, text messaging app, social media, or other app on the handheld device 30, and need not be through the subsystem 12. For example, an email app resident on the handheld device 30 is called by the agent application 40, and the feedback is automatically copied into the email by the agent application 40. The showing agent "R" may then edit the email prior to sending the feedback to the listing agent "S."

Figure 7:
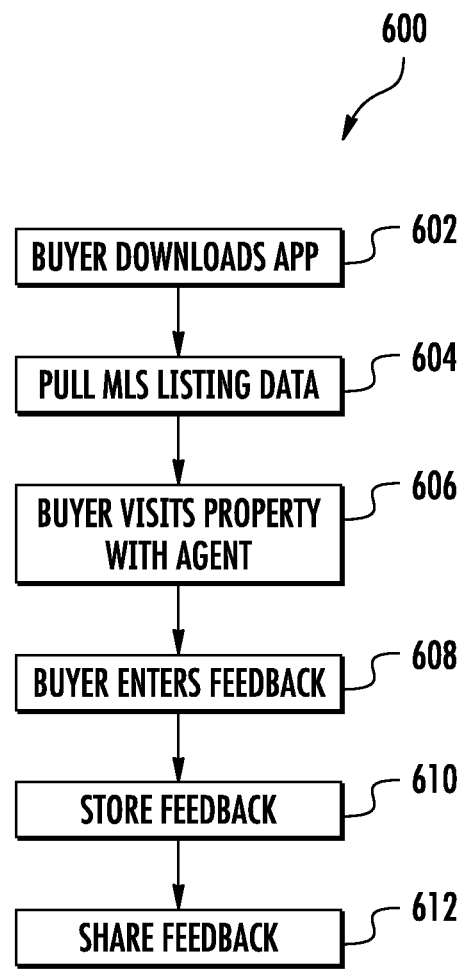
FIG. 7 is a flowchart to provide feedback from a buyer's handheld device.

With reference to FIG. 7, a method 600 for providing feedback via the real estate feedback application 500 from the perspective of the buyer "B" is disclosed in terms of functional block diagrams. The functions are programmed software routines and executable instructions capable of execution in various microprocessor based electronics control embodiments and represented herein as block diagrams.

Initially, the buyer "B" may download (602) the real estate feedback application 500 from a source such as an app store. The real estate feedback application 500 communicates (604) with the listing recommendation server 14 via the buyer API 34 to pull the agent selected MLS listings. The showing agent "R" then typically escorts the buyer "B" for a showing of particular properties selected by the buyer (606). Next, during the showing, the buyer "B" enters (608; FIG. 5) the feedback into the real estate feedback application 500. The real estate feedback application 500 then saves the feedback for retrieval at a later time (610). The buyer "B" can then utilize the real estate feedback application 500 to review the feedback and compare notes on the properties.

Figure 8:
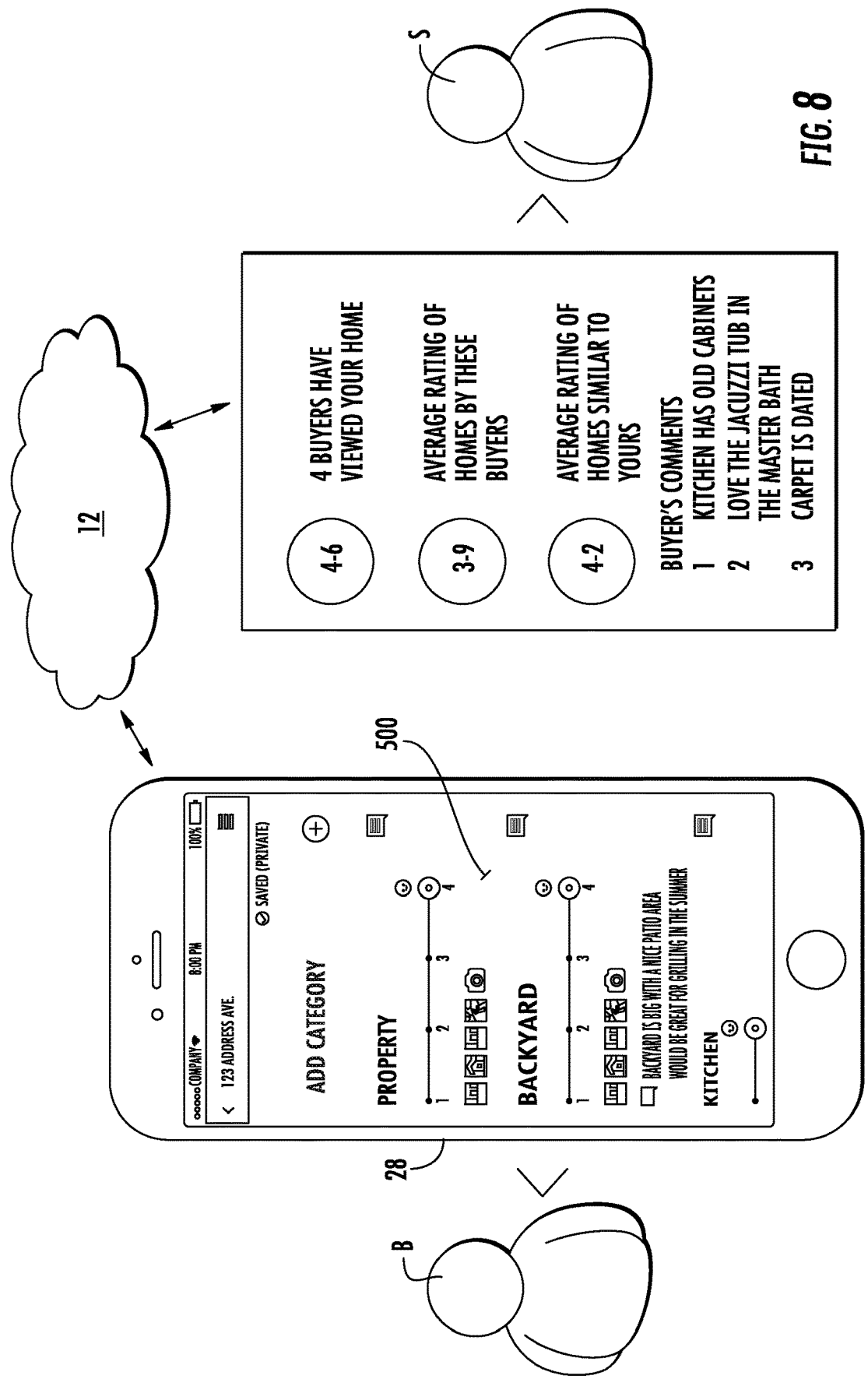
FIG. 8 is a schematic block diagram of feedback provided from a buyer's handheld device to a seller.

Once the showing is complete, the buyer can choose to share the ratings with their showing agent "R" (612). If they so choose, the real estate feedback application 500 will send a message to the listing recommendation server 14 though the buyer API 20 to release the ratings to the showing agent "R." The feedback may be provided to the listing agent "L" through the subsystem 12. In this embodiment, the real estate feedback application 500 uploads the feedback data from the buyer database 18 to the electronic key server 22 via the buyer API 34 which then generates a report for the listing agent "L" (FIG. 8). The feedback report may include, but is not limited to, the buyer's feedback on the subject property, the buyer's feedback on the subject property compared to other properties, the buyer's interest in the subject property compared to other buyers' interest in the subject property by other buyers, other properties which may be comparable to the subject property based on the buyer's feedback, etc.

Figure 9:
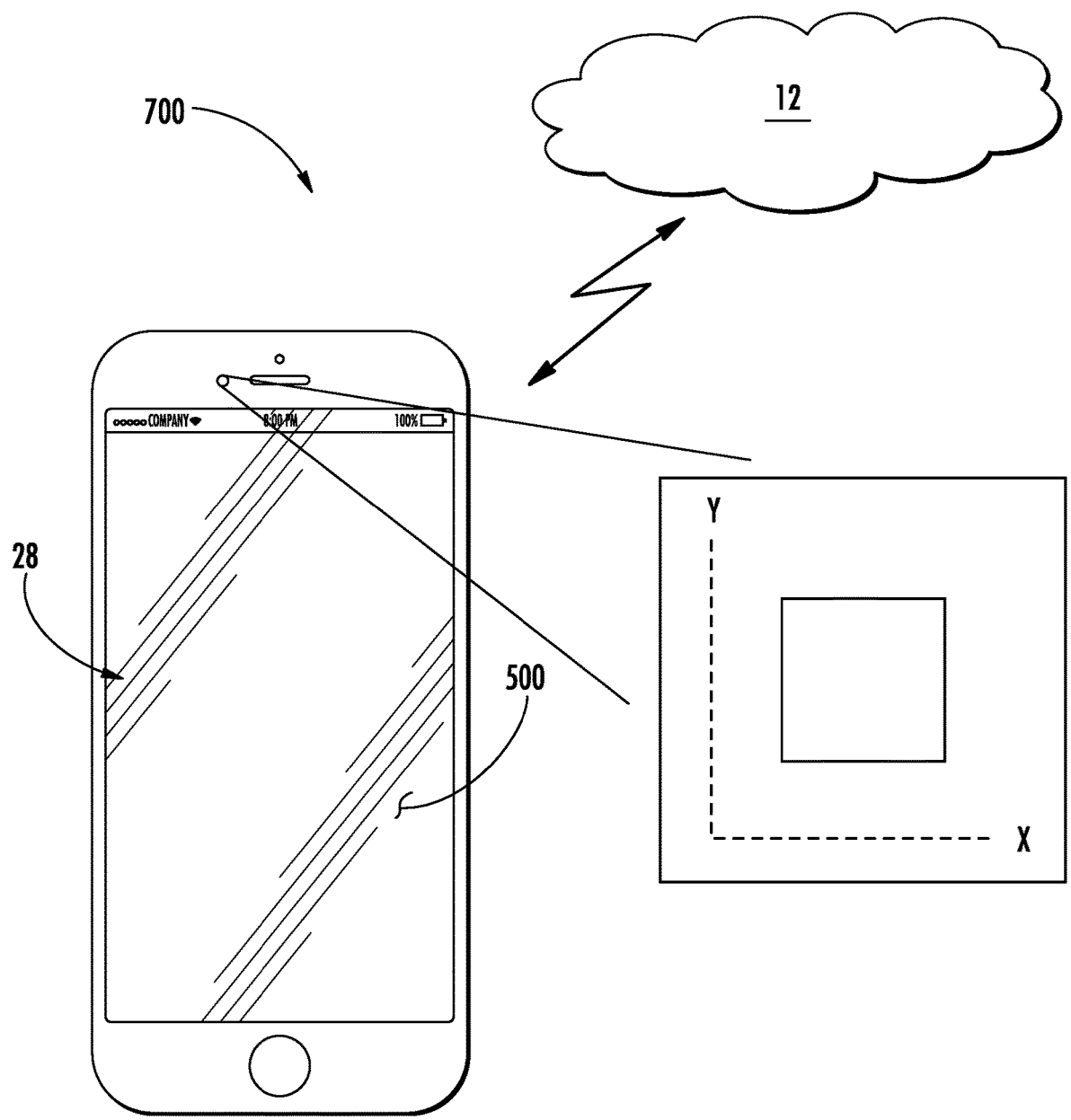
FIG. 9 is a general schematic diagram of a real estate property attractiveness scoring application according to one embodiment.

With reference to FIG. 9, in addition to the features discussed above, a user can utilize a real estate property attractiveness scoring application 500A to score the attractiveness of the subject property based on images 400. The real estate property attractiveness scoring application 500A may be a separate application and/or a module of the real estate application 38, the agent application 40, or a separate Internet based interface.

Figure 10:
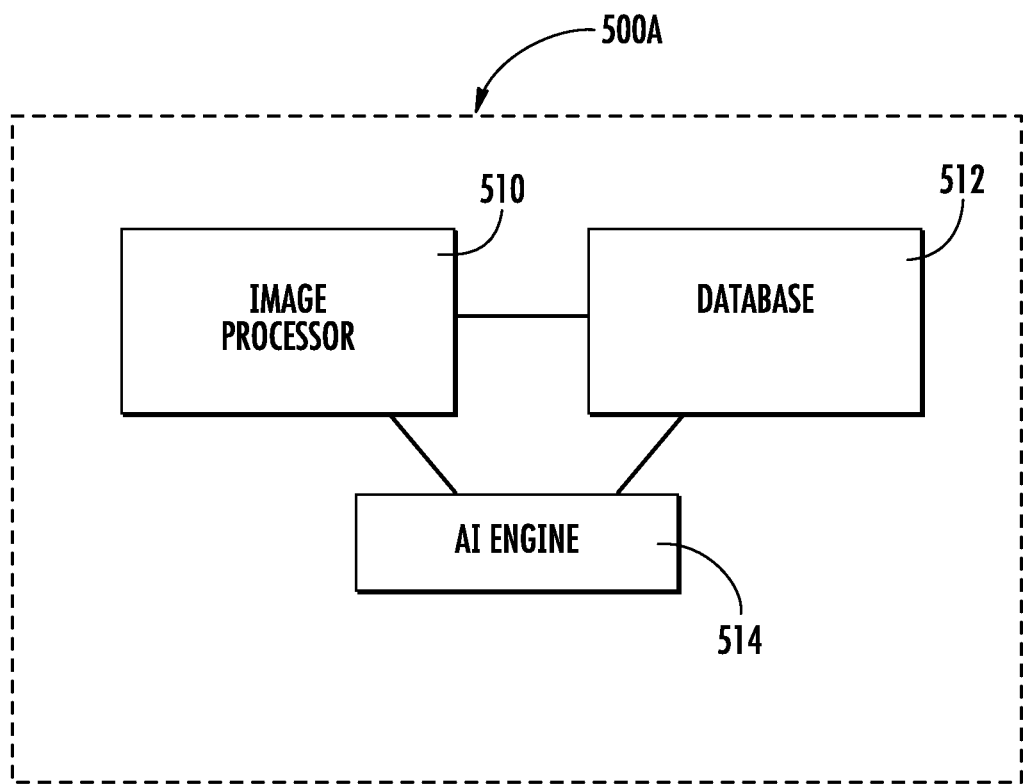
FIG. 10 is a schematic diagram of an architecture for the real estate property attractiveness scoring application.

With reference to FIG. 10, the real estate property attractiveness scoring application 500A includes an image processor 510, a database 512, and an artificial intelligence engine 514. Although the image processor 510, the database 512, and the artificial intelligence engine 514 are associated with the real estate property attractiveness scoring application 500A and may all be on board the handheld device 28, one or more modules thereof may be located in the subsystem 12. In one embodiment, the database 512 is proprietary and located in the subsystem 12 that is accessed by through the real estate feedback application 500.

The image processor 510 may include various image conversion modules to obtain red, green blue (RGB) and perspective data. The database 512 stores a multiple of images and may include, for example, access to the camera roll stored in the memory 66 of the handheld device 28. That is, the database 512 can in part include image stored on the handheld device 28 such as image of the subject property taken by the user and image stored in the buyer storage system 18 such as image of comparable or other properties. The artificial intelligence engine 514 is in communication with the image processor 510 and the database 512 to associate the image characteristics of the subject property with an attractiveness score as will be further described below.

Figure 11:
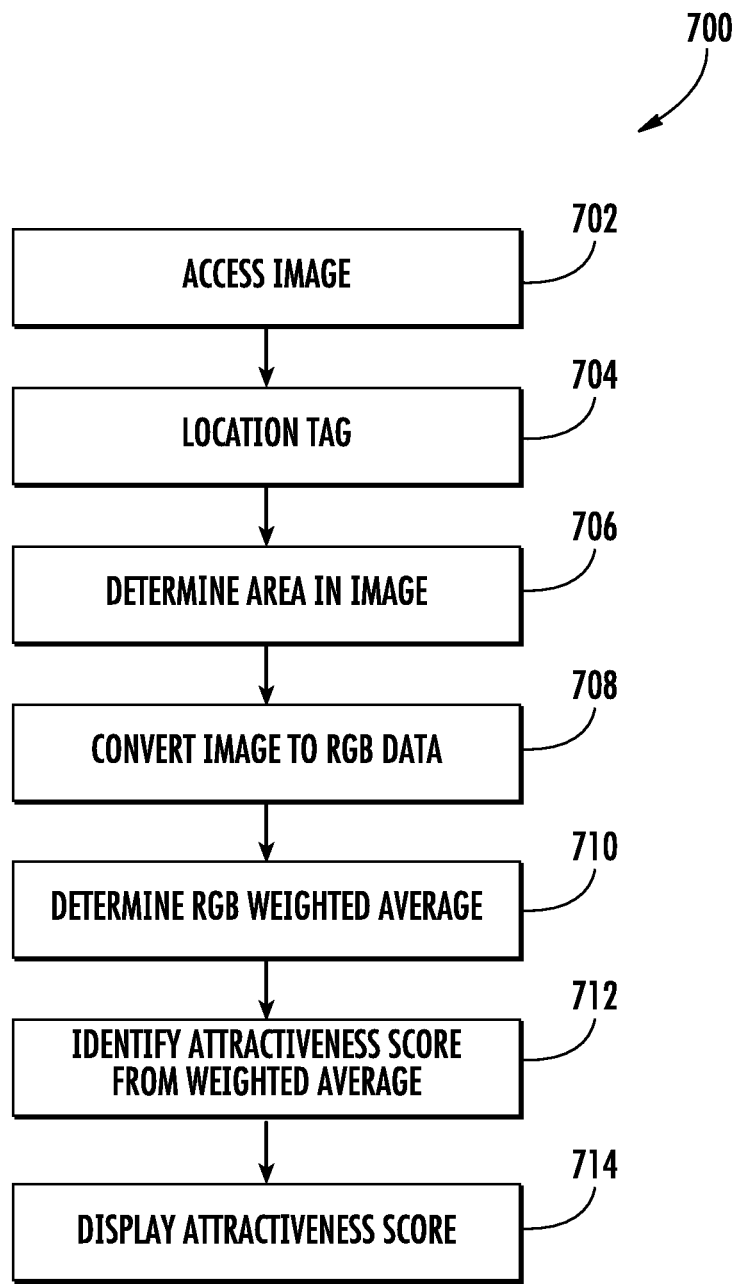
FIG. 11 is a schematic block diagram illustrating operation of the real estate property attractiveness scoring application.

With reference to FIG. 11, a method 700 for scoring attractiveness of the subject property based on at least one image of the subject property is illustrated in terms of functional block diagrams. Initially, an image from the database 512 is accessed (302) by the image processor 510. In one or more embodiments, the image may be tagged with a location (704) within the subject property via, for example, global positioning of the buyer within the property when the image is captured by way of the GPS module 68 (FIG. 2), selection in the real estate property attractiveness scoring application 500A, or other location identification.

The image processor 510 may also be utilized to determine the perspective of the image within an x, y, z coordinate system in order to determine an area (706). For example, the real estate property attractiveness scoring application 500A may present a view of the image, in which the x, y, or z, planes are overlaid on the image to ensure that the image is identifying particular areas (e.g., floor, walls, or ceiling) of the room such that the areas are within the proper coordinate system.

The pixel data from the image is converted to RGB data by the real estate property attractiveness scoring application 500A. For example, white is (255, 255, 255). Colors may be identified as an RGB range in the database 512 for access by the real estate property attractiveness scoring application 500A. For example, white may be classified as a range (e.g., 222, 222, 222 to 255, 255, 255). The image processor 510 may be initially trained to recognize, for example, wood, stainless steel, carpet, paint, tile, and or other known colors and textures from the RGB data. Furthermore, the image processor 510 can be trained to a fidelity that commercially recognized identifiers such as paint chip numbers, appliance brands or other details may be recognized from the RGB data and stored in the database 512.

Figure 12:
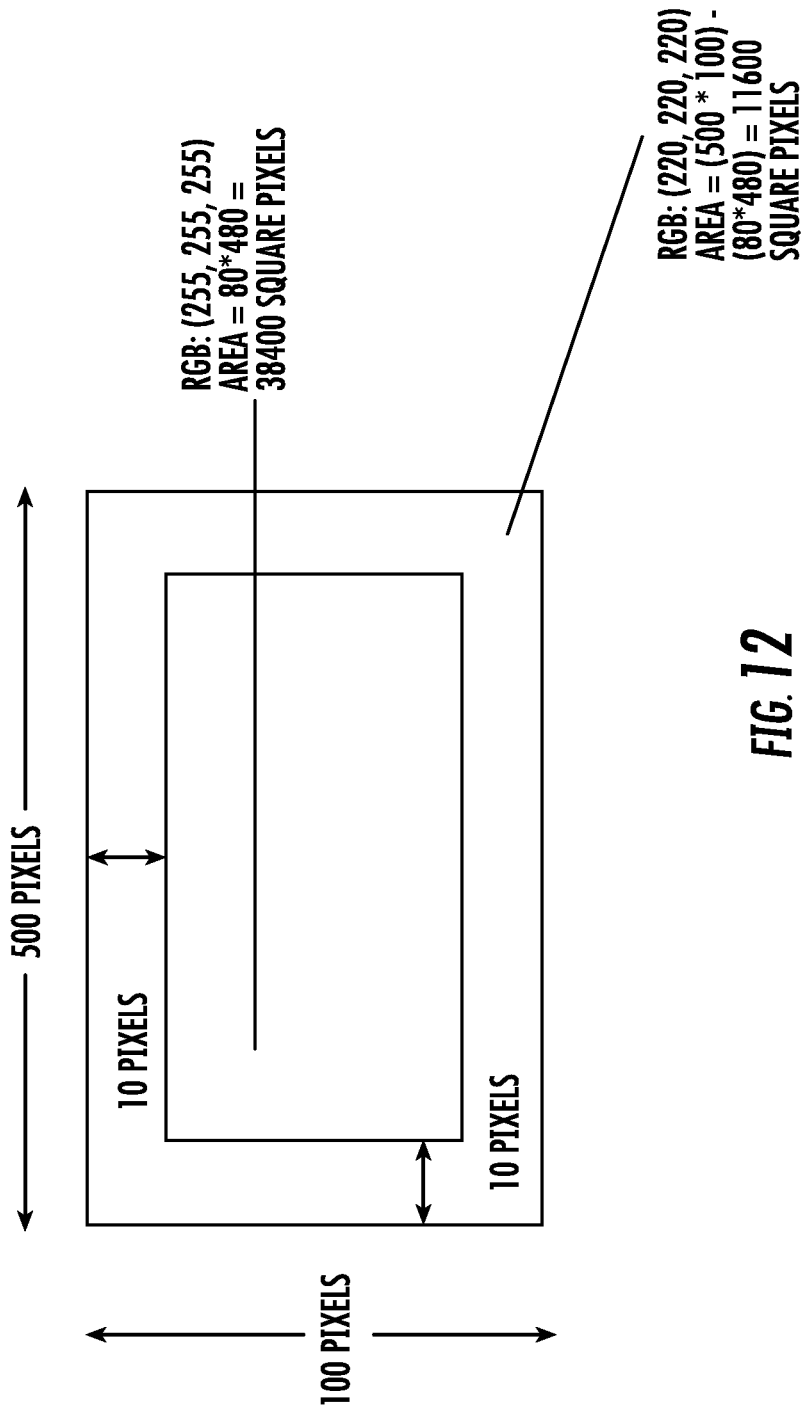
FIG. 12 is a schematic block diagram to illustrate operation of the real estate property attractiveness scoring application of FIG. 11.

A weighted average of the RGB data for the image is then calculated (710). The weighted average may be a percentage of the image that is within a certain RGB range. In one example, the weighted average may be determined by segregating the image by the number of pixels in each of one or more areas defined by different RGB data (FIG. 12). Each of the multiple of areas are defined by recognition of the RGB data in the image and determination of a percentage thereof (FIG. 13). A weighted average may work well when there are multiple colors that are not too different (gray and white for instance). Alternatively, a simple majority may be utilized to avoid an average RGB score which doesn't represent any of the colors captured in the room.

The RGB attractiveness score is determined by calculating a distance to all of the RGB colors. The RGB data in the image is compared to the RGB data in an attractiveness score table (FIG. 15) to determine the closest color match. Colors in the attractiveness score table, which are provided with a particular attractiveness score, may be defined as an RGB range. The colors may also be associated with particular serial numbers or other identifiers to permit commercial identification for particular paint, upholstery, carpet, floor coverings, etc.

Then, the closest color match in the attractiveness score table for the image is utilized to identify the associated attractiveness score (e.g., 1-10) (712; FIG. 15).

The associated attractiveness score is then displayed (714) on the real estate property attractiveness scoring application 500A. In embodiments, attractiveness score may be displayed in the context of comparable properties and associated historical sales data such as time on market, price, etc.

The attractiveness score for the comparable properties may change over time. That is, as more comparable properties are identified, the attractiveness score identifies more closely with current desirable colors and texture. That is, some styles fall in and out of favor over time and thus the attractiveness score of the comparable properties adjusts over time to accommodate popularity as what was popular and desirable a few years ago, may not be presently popular. Although illustrated as a score between 1-10 in the illustrated embodiment, various score scales (e.g., such as 1-100) and weighting factors (multipliers) may alternatively or additionally be utilized. The particular table of attractiveness scores for various colors may be proprietary and stored in the subsystem 12.

Figure 16:
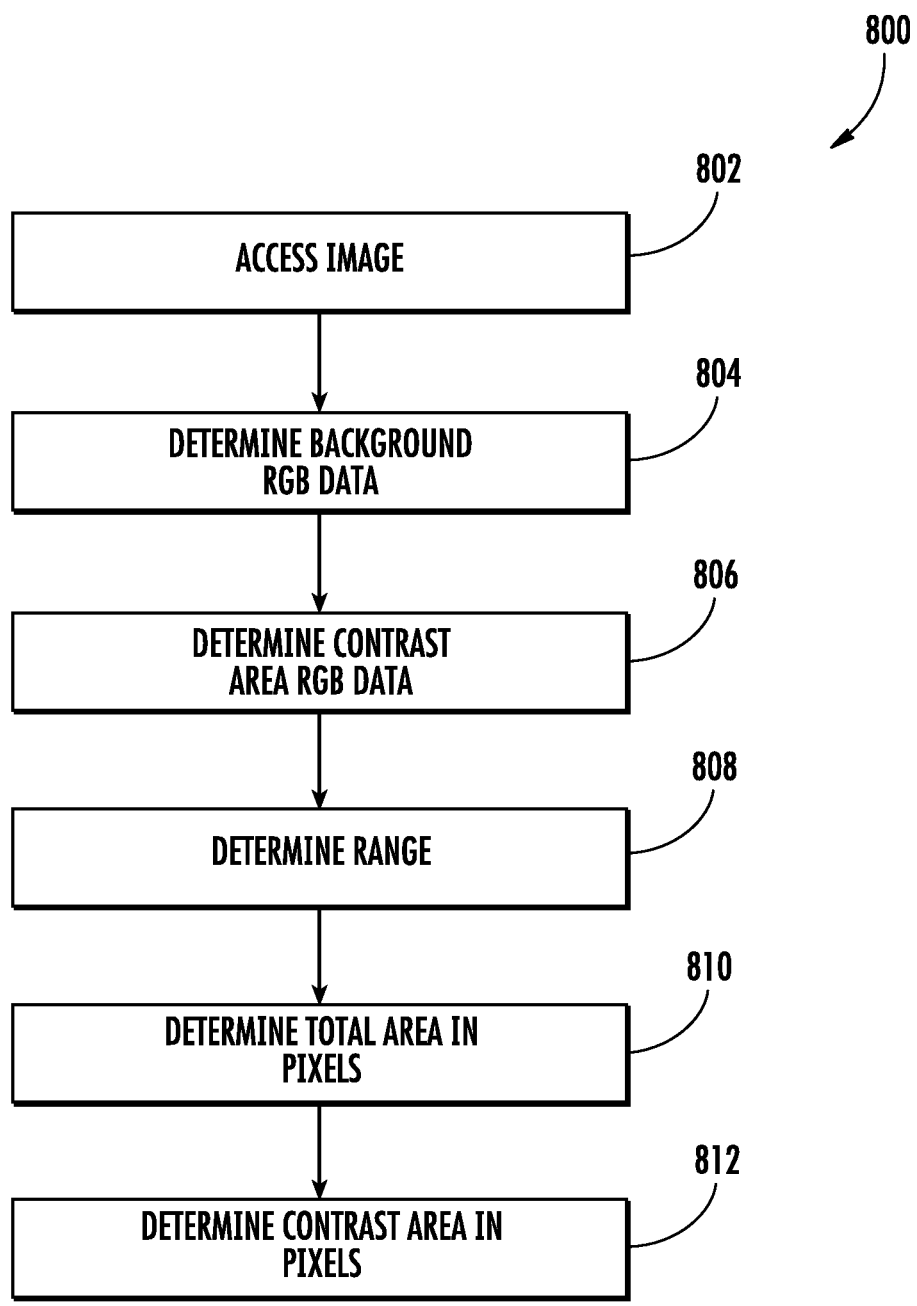
FIG. 16 is a schematic block diagram to illustrate operation of the real estate property attractiveness scoring application according to another embodiment.

With reference to FIG. 16, in another embodiment, a method 800 for determining a texture attractiveness score for an image associated with the subject property is illustrated in terms of functional block diagrams. The texture attractiveness score permits determination of a texture finish and/or material.

Figure 17:
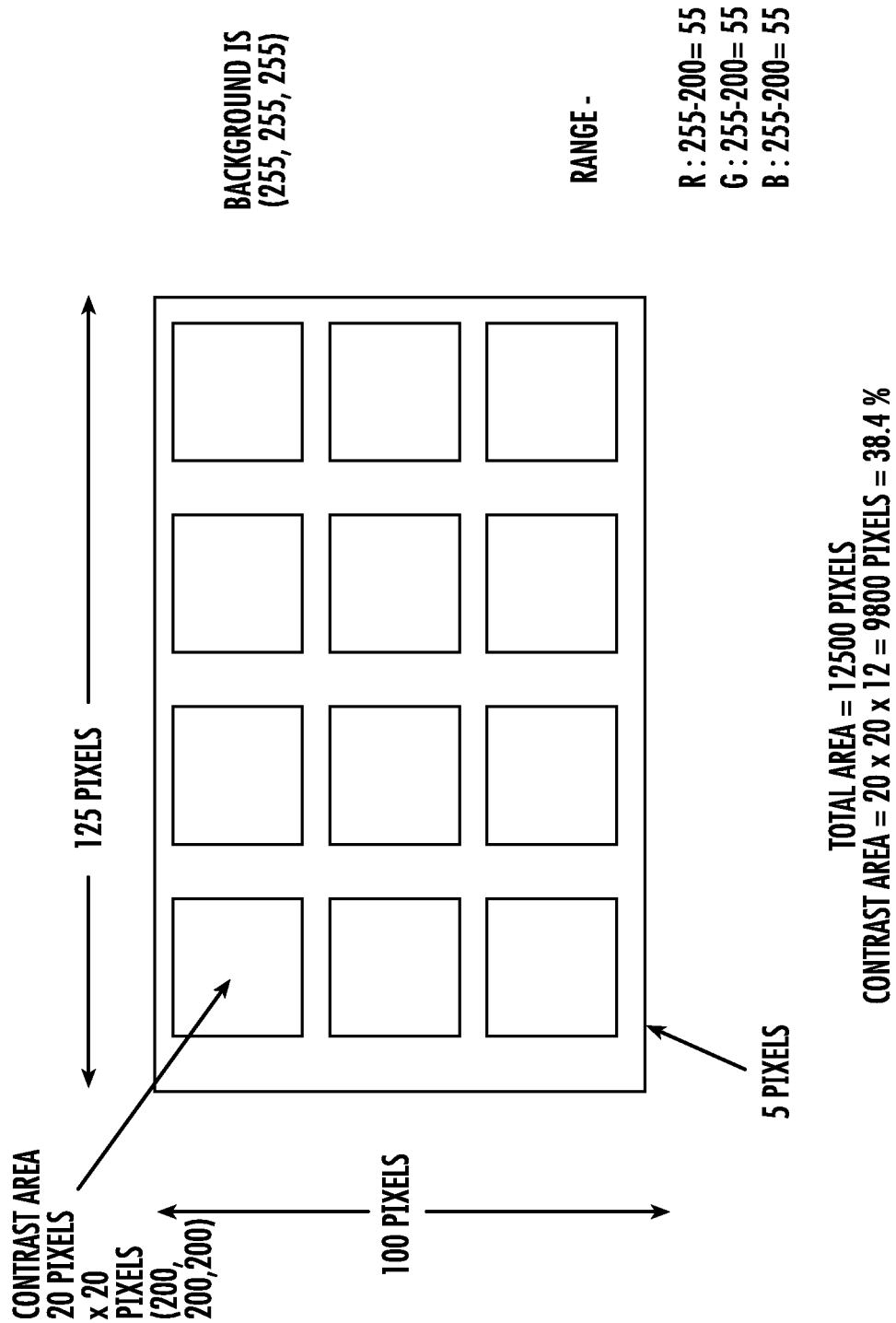
FIG. 17 is a schematic block diagram to illustrate operation of the real estate property attractiveness scoring application of FIG. 16.

Initially, the image from the database 512 is accessed (802) as described above. The background RGB data (804) and RGB data for contrast areas (806) are determined (FIG. 17). Next, a range in the RGB data between the background RGB data and the other contrast areas is determined (808). Next, a total area in pixels (810) and a total area for contrast areas (812) are determined. From the pixel data, the range in the RGB data (difference between at least one pixel and another over any of R, G, or B) and a frequency of outliers (furthest distance between any pixel over any of R, G, or B value) can be utilized to determine a texture and an associated attractiveness score from a table (FIG. 18). For example, a relatively small range in the RGB data can be the difference between any pixel and another pixel (e.g., larger than 127 over any of R, G, or B in the RGB data) in contrast to a relatively large range in RGB data (e.g., greater than 127 pixels). In another example, infrequent outliers may be defined as the minimum or maximum R, G, B distance in the RGB data being less than or equal to 10% of all the pixels in the image while frequent outliers may be defined as the count of the minimum or maximum R, G, B distance in the RGB data being greater than 10% of all the pixels in the image. Various parameters can be predefined in a look-up table in the database 512 to determine the texture and an associated attractiveness score therefor.

Composite attractiveness scores from the real estate property attractiveness scoring application 500 may be further associated with specific images based on the image tags. Based on these attractiveness scores, and the pixel data described above, the attractiveness of the subject property may be forecast based on color and texture in the image as compared to the historical data of images from comparable properties. The data collected from images may, for example, show that kitchens with white wall tones are consistently rated higher than those with other hues.

The term "server" conveys its customary meaning that provides service and/or data connection, e.g., to the handheld device and/or an electronic locking device. The term "handheld device" refers to a portable electronic device that is at least configured to send messages to, and/or receive messages from the listing recommendation server 14 over a long-range wireless communication network, such as a SMS, wireless, or cellular network. Examples of handheld devices include, but are not limited to: a cell phone; a personal digital assistant ("PDA"); a portable computer configured to store and playback digital pictures, songs, and/or videos; and the like. In addition, the handheld device is typically also configured for short-range wireless communications.

The elements described and depicted herein, including in flow charts and block diagrams throughout the figures imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure.

The use of the terms "a", "an", "the", and similar references in the context of description (especially in the context of the following claims) are to be construed to cover both the singular and the plural, unless otherwise inzadicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason, the appended claims should be studied to determine true scope and content.

What is claimed:

1. A computer-implemented method for scoring attractiveness of a real estate property, comprising:
   converting, using a processor, an image of a subject real estate property from an input device to RGB data;
   identifying, using the processor, an attractiveness score from the RGB data, the attractiveness score stored in a memory encoded with logic executable by the processor, wherein the converting the image to the RGB data comprises determining a color in a background area in the image by an artificial intelligence engine and determining a color in a contrast area in the image, the contrast area in the image different than the background area; and
   displaying the attractiveness score to a user via a display in communication with the processor.

2. The method as recited in claim 1, further comprising receiving the image from the input device of a handheld device operating a real estate property attractiveness scoring application executable by the processor, the handheld device comprising the processor, the memory, the input device, and the display.

3. The method as recited in claim 2, wherein the attractiveness score is related to historical sales data of at least one comparable property that is comparable to the subject property, the at least one comparable property and the historical sales data stored in a buyer storage system accessible by the real estate property attractiveness scoring application.

4. The method as recited in claim 3, further comprising adjusting the attractiveness score for the at least one comparable property over time by an artificial intelligence engine in communication with the buyer storage system.

5. The method as recited in claim 4, wherein the attractiveness score and RGB data are defined in the table stored in the database, the database stored in a buyer storage system accessible by a handheld device operating a real estate property attractiveness scoring application.

6. The method as recited in claim 5, wherein a color is identified by a range of the RGB data.

7. The method as recited in claim 1, further comprising training an artificial intelligence engine from metatags for an image and associated attractiveness ranking, the artificial intelligence engine in communication with the processor.

8. The method as recited in claim 1, wherein the converting the image to the RGB data comprises determining a texture in the image by an artificial intelligence engine.

9. A computer-implemented method for scoring attractiveness of a real estate property, comprising:
   converting, using a processor, an image of a subject real estate property from an input device to RGB data;
   identifying, using the processor, an attractiveness score from the RGB data, the attractiveness score stored in a memory encoded with logic executable by the processor, wherein identifying the attractiveness score from the RGB data comprises determining a difference between at least one pixel and another pixel over any of R, G, or B data to determine a range in the RGB data by an artificial intelligence engine; and
   displaying the attractiveness score to a user via a display in communication with the processor.

10. A computer-implemented method for scoring attractiveness of a real estate property, comprising:
    converting, using a processor, an image of a subject real estate property from an input device to RGB data;
    identifying, using the processor, an attractiveness score from the RGB data, the attractiveness score stored in a memory encoded with logic executable by the processor, wherein identifying the attractiveness score from the RGB data comprises determining a furthest distance to any pixel over any of R, G, or B data to determine a frequency of outliers in the RGB data by an artificial intelligence engine; and
    displaying the attractiveness score to a user via a display in communication with the processor.

11. The method as recited in claim 1, further comprising identifying a commercially recognized identifier from the RGB data stored in a database, the commercially recognized identifier stored in the database accessible by a handheld device operating a real estate property attractiveness scoring application.

12. The method as recited in claim 1, further comprising identifying a paint chip number from the RGB data stored in a database, the paint chip number stored in a database accessible by a handheld device operating a real estate property attractiveness scoring application.

13. The method as recited in claim 1, further comprising identifying an appliance brand from the RGB data stored in a database, the appliance brand stored in the database accessible by a handheld device operating a real estate property attractiveness scoring application.

14. The method as recited in claim 1, wherein converting the image to RGB data comprises training an artificial intelligence engine for a known color.

15. The method as recited in claim 1, wherein converting the image to RGB data comprises training an artificial intelligence engine with RGB data for a known texture.

16. A real estate property attractiveness scoring system for scoring attractiveness of a real estate property from an image of a subject real estate property, comprising:
    a processor and memory configured to execute software instructions embodied within the following modules:
    an image processor to receive an image of a subject real estate property and convert the image to RGB data;
    a database of RGB data and an attractiveness score associated with the RGB data; and
    an artificial intelligence engine in communication with the image processor and the database to identify the attractiveness score in the database that is associated with the RGB data from the image processor, the attractiveness score based at least in part on historical sales data of at least one comparable property that is comparable to the subject property, wherein the artificial intelligence engine is operable to determine a difference between at least one pixel and another pixel over any of the R, G, or B data to determine a range in the RGB data to determine a color and an associated attractiveness score from a table stored in the database.

17. The system as recited in claim 16, wherein at least one of the image processor, the database, and the artificial intelligence engine, are resident on a handheld device.

18. A real estate property attractiveness scoring system for scoring attractiveness of a real estate property from an image of a subject real estate property, comprising:
- a processor and memory configured to execute software instructions embodied within the following modules:
- an image processor to receive an image of a subject real estate property and convert the image to RGB data;
- a database of RGB data and an attractiveness score associated with the RGB data; and
- an artificial intelligence engine in communication with the image processor and the database to identify the attractiveness score in the database that is associated with the RGB data from the image processor, the attractiveness score based at least in part on historical sales data of at least one comparable property that is comparable to the subject property, wherein the artificial intelligence engine is operable to determine a furthest distance to any pixel over any of the R, G, or B data to determine a frequency of outliers in the RGB data to determine a texture and an associated attractiveness score from a table stored in the database.

* * * * *